US009545775B2

(12) United States Patent
Al-Azem

(10) Patent No.: US 9,545,775 B2
(45) Date of Patent: Jan. 17, 2017

(54) ATTACHMENT SYSTEMS AND METHODS USABLE TO FORM ENCLOSURES

(76) Inventor: Samer U. Al-Azem, Houston, TX (US)

(*) Notice: Subject to any disclaimer, the term of this patent is extended or adjusted under 35 U.S.C. 154(b) by 850 days.

(21) Appl. No.: 13/461,553

(22) Filed: May 1, 2012

(65) Prior Publication Data

US 2012/0279972 A1 Nov. 8, 2012

Related U.S. Application Data

(60) Provisional application No. 61/481,296, filed on May 2, 2011.

(51) Int. Cl.
| | | |
|---|---|---|
| *B32B 7/08* | (2006.01) | |
| *B23K 37/00* | (2006.01) | |
| *B32B 1/02* | (2006.01) | |
| *A47G 9/02* | (2006.01) | |
| *E04B 2/74* | (2006.01) | |

(52) U.S. Cl.
CPC ............. *B32B 7/08* (2013.01); *B23K 37/006* (2013.01); *B32B 1/02* (2013.01); *A47G 9/0246* (2013.01); *E04B 2/7425* (2013.01); *Y10T 428/13* (2015.01); *Y10T 428/24008* (2015.01); *Y10T 428/24017* (2015.01)

(58) Field of Classification Search
CPC ....... A47G 9/0246; B65D 33/00; B65D 33/08; A63B 61/02; B32B 7/08; Y10T 428/24008

USPC ...... 220/612, 531, 530, 529, 4.22, 552, 551; 428/100; 493/128; 2/69
See application file for complete search history.

(56) References Cited

U.S. PATENT DOCUMENTS

| | | | | |
|---|---|---|---|---|
| 4,257,207 A | * | 3/1981 | Davis | 52/578 |
| 5,170,505 A | * | 12/1992 | Rohrer | 2/69 |
| 5,316,541 A | | 5/1994 | Fischer | |
| 7,014,057 B2 | * | 3/2006 | Wang | 220/7 |
| 2006/0174525 A1 | * | 8/2006 | Hughes | 40/603 |
| 2008/0282652 A1 | | 11/2008 | Wardlaw | |
| 2011/0296612 A1 | * | 12/2011 | Papp et al. | 5/424 |

FOREIGN PATENT DOCUMENTS

GB WO2007148075 A1 12/2007

* cited by examiner

*Primary Examiner* — Anthony Stashick
*Assistant Examiner* — Raven Collins

(57) ABSTRACT

Enclosures and panels for forming such enclosures can include a first edge having a front side and a rear side, each side having a first portion of a fastening medium thereon, and a second edge having first and second flaps, each flap having an inner surface with a second portion of the fastening medium thereon. The flaps of a first panel can engaged with the front and rear sides of an adjacent panel, and similarly, any number of adjacent panels can be engaged in this manner to form a sealed enclosure, usable for maintaining a pressure differential between the interior and exterior thereof.

12 Claims, 5 Drawing Sheets

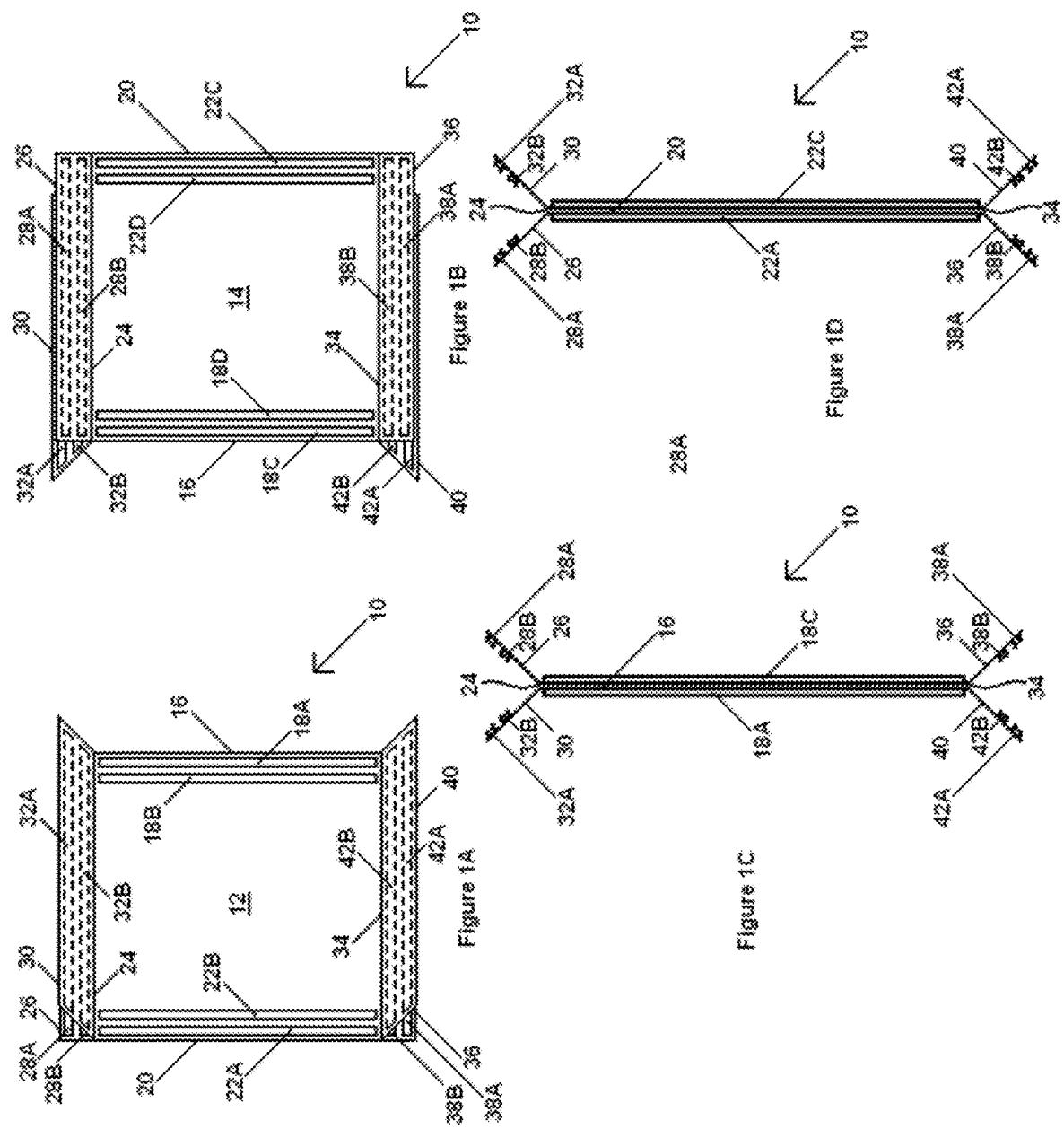

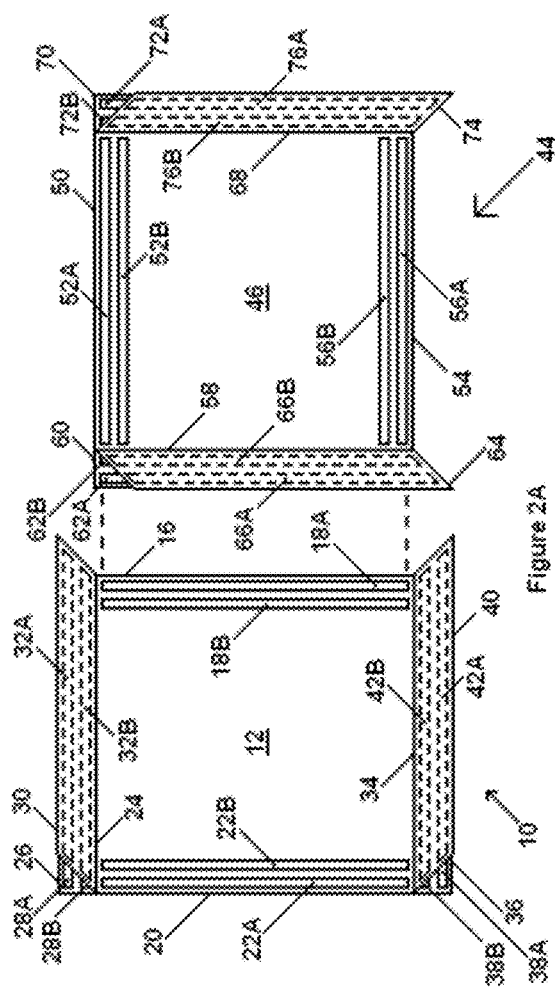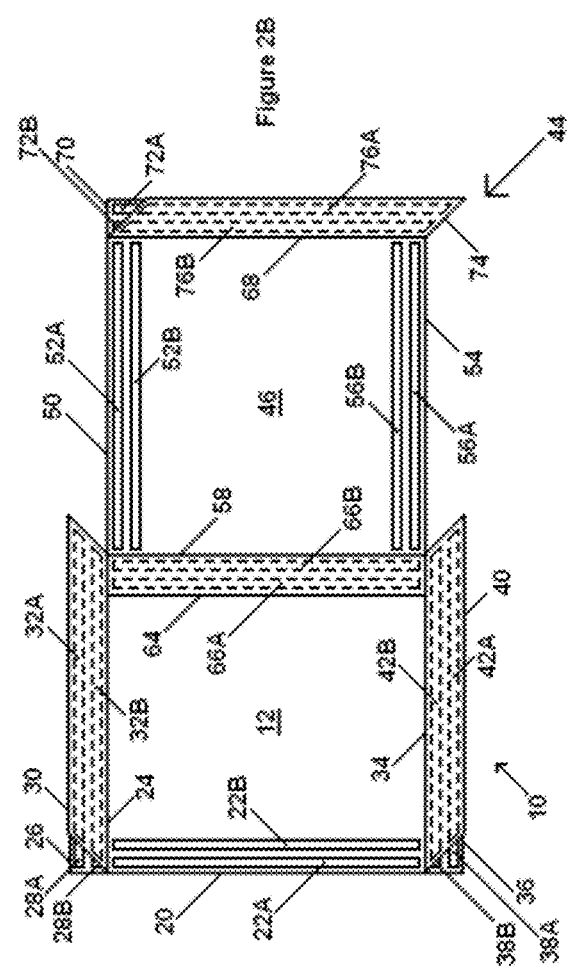

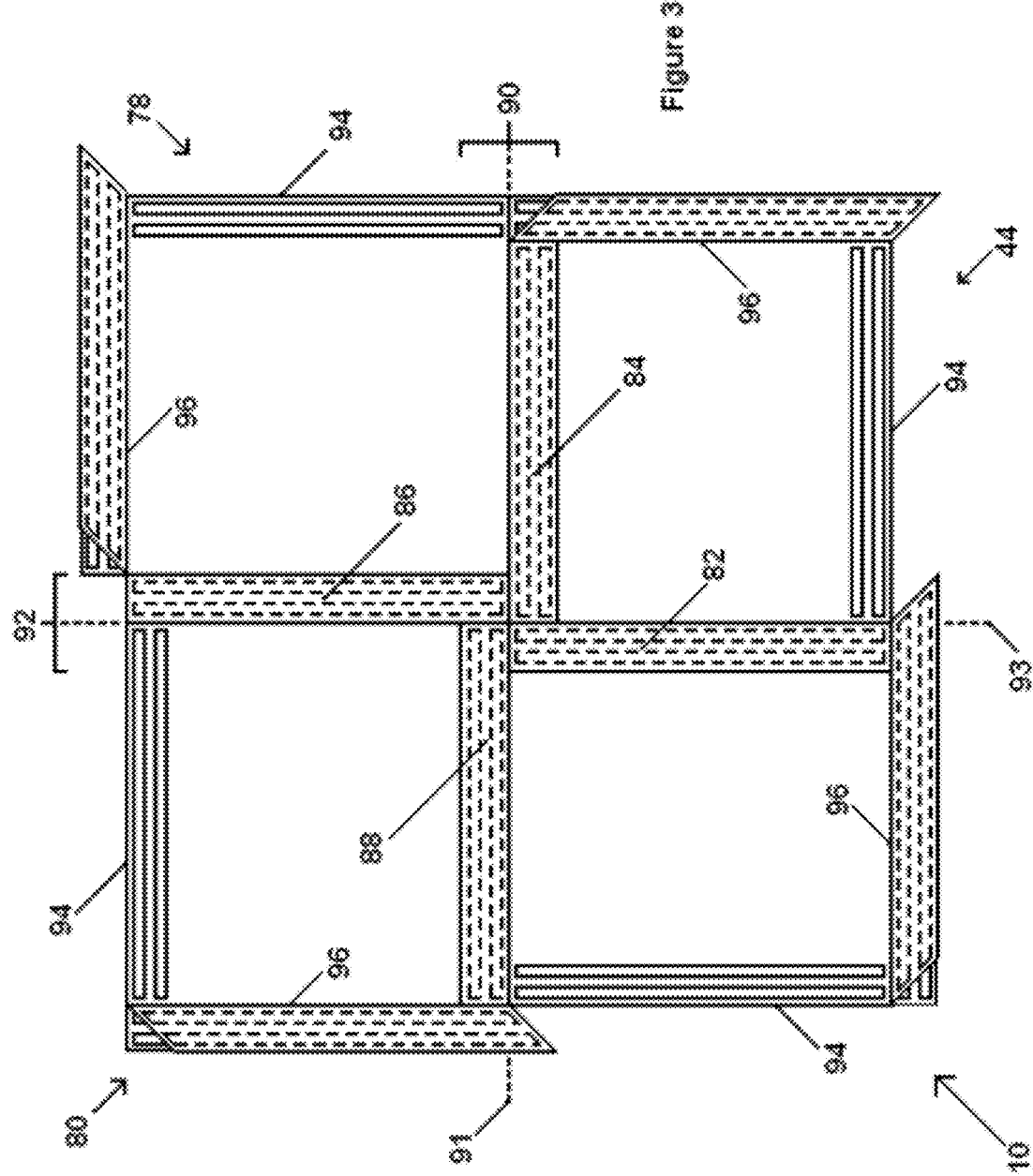

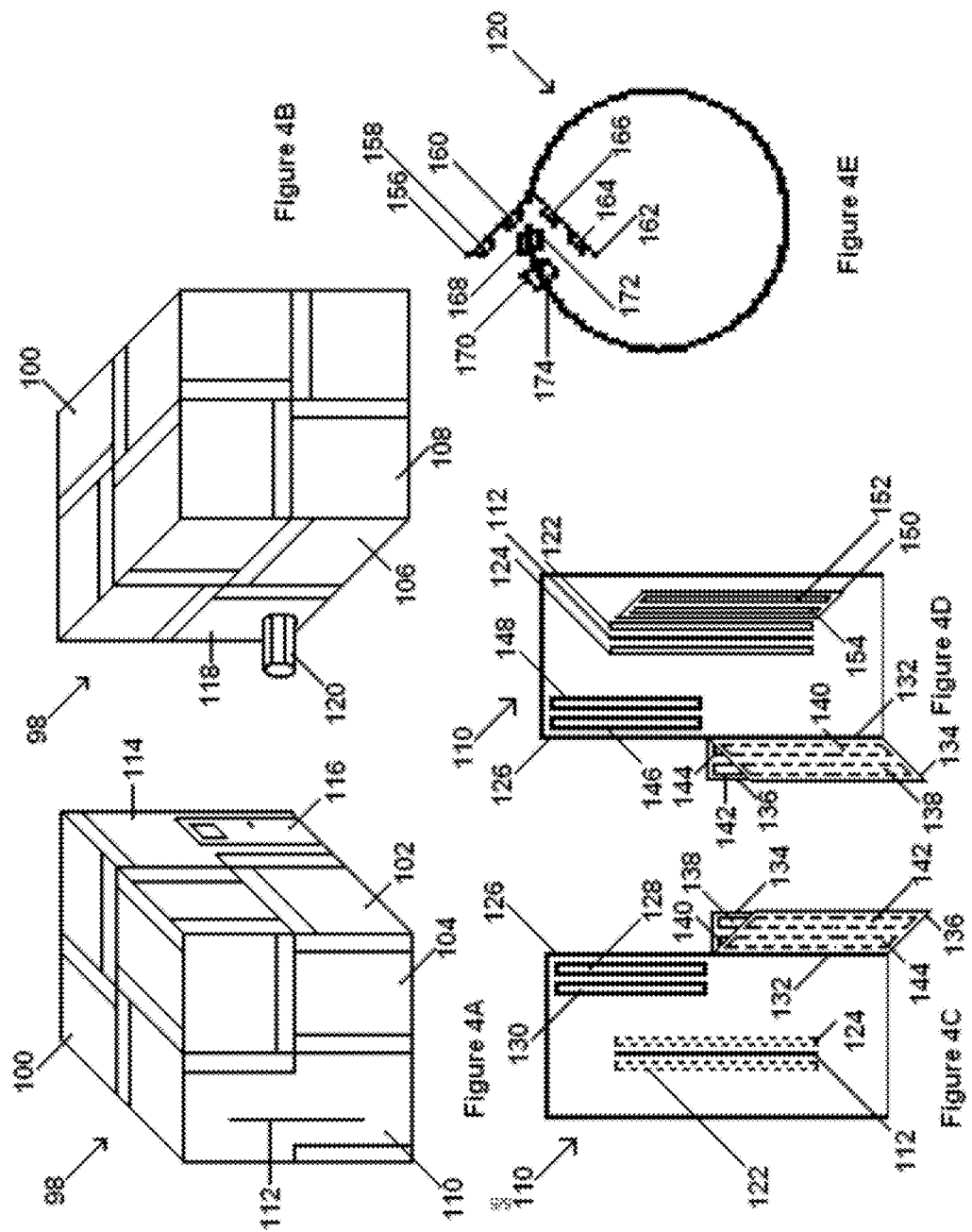

ATTACHMENT SYSTEMS AND METHODS USABLE TO FORM ENCLOSURES

CROSS-REFERENCE TO RELATED APPLICATION

The present application claims priority under 35 U.S.C. §119(e) to the co-pending United States provisional application for patent, having the application Ser. No. 61/481,296, filed May 2, 2011, the entirety of which is incorporated herein by reference.

FIELD

Embodiments usable within the scope of the present disclosure relate, generally, to systems and methods of attachment usable to form enclosures, and more specifically, to enclosures usable to contain pressure, perform hot-work (e.g., welding operations), contain sparks, or isolate ignition sources, or similar functions.

BACKGROUND

When welding or performing other hot-work operations, especially in an offshore environment, it is typically necessary to perform such operations in an isolated enclosure or, to a lesser extent, contain any ignition sources, such as sparks that result from performing hot-work operations. Such enclosures could either be predominantly sealed to enable a positive pressure to be maintained within, thereby preventing the entry of flammable and/or hazardous gasses, and protecting occupants from inclement weather or other undesirable exterior conditions, or, to a lesser extent, could be partially sealed where the objective is to merely contain hot-work operations and/or protect occupants from inclement weather or other undesirable weather conditions. Vents and/or blowers are often used to transport gasses produced and/or heated by welding or other operations from within the enclosure to the outside, and to flow fresh air into the enclosure, thereby preventing the accumulation of harmful gasses and maintaining a comfortable temperature and working environment within. Normally, such intake vent/s and/or blower/s provide air into the enclosure at a rate that exceeds that at which air within the enclosure is evacuated and/or lost (e.g., a 2:1 ratio), such that the positive pressure within the enclosure is maintained.

Conventional enclosures include rigid panels that are time consuming and difficult to transport and assemble on-site. Alternative enclosures can include inflatable structures and/or flexible structures made from lightweight panels. Typically, a flexible enclosure usable for hot-work operations or similar undertakings includes a series of panels having a portion of a zipper on each edge that must be aligned with a corresponding portion of a zipper along the edge of an adjacent panel to attach the panels together. To prevent exposure of a zipper on the interior of the enclosure to the hot-work environment within, a flap can be used to cover the zipper using Velcro™ or a similar hook-and-loop fastening medium, or other means of attachment. While transport and erection of such a flexible enclosure may be more efficient than many conventional alternatives, alignment, mating, and covering of numerous zippers remains a tedious and time consuming undertaking.

Additionally, flexible enclosures require at least two types of panels to enable mating portions of zippers to be paired and engaged. A lack of interchangeability between panels can often become a hindrance if a panel or zipper is damaged and/or ripped, and a specific type of replacement panel must be located. Additionally, use of zippers is often undesirable due to the propensity of zippers to become caught or damaged when subjected to excessive force or extreme environments. An individual falling into the wall of an enclosure or otherwise forcefully contacting the wall may cause one or more zippers to become damaged or partially unfastened, mitigating the ability of the enclosure to maintain a positive pressure within. When rapid exit from an enclosure is desired for safety reasons, manipulation of a zipper that is covered by a Velcro™ flap or similar fastening medium can be dangerously time consuming and unreliable. Further, if a zipper becomes damaged, the entire engagement between mating panels can be compromised, and on-site repair and/or replacement of a zipper requires tools uncommon to a hot-work environment.

As such, a need exists for systems and methods of attachment usable to form enclosures or other structures capable of securely maintaining positive pressure quickly and/or efficiently and safely containing ignition sources created as a result of the performance of hot-work related operations, without requiring tedious installation steps such as the mating and alignment of zippers.

A need also exists for systems and methods of attachment usable to form securely sealed enclosures or spark containment devices/systems that are far less likely to become unfastened and/or damaged than conventional alternatives.

A further need exists for systems and methods of attachment that can include use of uniform, interchangeable panels that can be mated with one another, avoiding the difficulties associated with production, storage, and installation of multiple types of panels.

Embodiments usable within the scope of the present disclosure meet these needs.

SUMMARY

Embodiments usable within the scope of the present disclosure include panels, usable to form a variety of enclosures or barriers. A panel can include a first edge having a front side and a rear side, each of the front and rear sides having a first portion of a fastening medium thereon. In a preferred embodiment, the fastening medium can include Velcro™ or a similar hook and loop fastening medium, though it should be understood that other fasteners and/or fastening methods (e.g., reusable or non-reusable adhesive, protrusions, rails, or similar features that mate with corresponding channels and/or orifices, etc.) can be used. A second edge of the panel can have a first flap and a second flap extending therefrom, each of the flaps having an inner surface with a second portion of the fastening medium thereon.

For example, both the front and rear sides of the first edge can include a plurality of strips of a hook portion of a hook and loop fastening medium extending across the length thereof, while both the first and second flap of the second edge can include a plurality of strips of a loop portion of a hook and loop fastening medium extending across the length thereof. Two panels can be connected by placing the first edge of a first panel between the flaps extending from the second edge of a second panel, then moving the flaps to contact the front and rear sides of first edge of the first panel such that the strips of fastening medium along the flaps engage the strips of fastening medium along the first edge. It should be readily understood that the hook portions and loop portions of the fastening medium could be interchanged in any manner or combination without affecting the functionality of the connection. Engagement in this manner can be accomplished rapidly, while providing a seal between connected panels, capable of maintaining a pressure differential across opposing sides of the panels, that withstands significant impact and shear forces without separating.

Embodied panels can include any number of additional edges, having the same configuration as the edges described above. For clarity, an edge having the configuration of the first edge may be referred to herein as a "male edge" while an edge having the configuration of the second edge may be referred to as a "female edge." A preferred embodiment includes a square panel, in which the length of the first edge (a male edge) is generally equal to that of the second (a female edge), having an additional male edge opposite the first edge with a substantially identical configuration to the first edge, and an additional female edge opposite the second edge having a substantially identical configuration to the second edge. This configuration provides a panel that can be engaged with up to four identical panels, from any direction, by mating a male edge of the panel with a female edge of an additional panel, or a female edge of the panel with a male edge of an additional panel. As such, any number of interchangeable panels can be engaged in this manner to form a barrier or enclosure having any desired size or shape.

The panels can include one or more heat resistant materials (e.g., fiberglass, silicone, other polymers), such that formation of an enclosed region using multiple panels can form an enclosure suitable for performing welding and/or other hot-work operations within.

Embodiments usable within the scope of the present disclosure also include enclosures, usable for performing welding and/or other hot-work operations, or for other purposes. It should be understood that while welding operations are often performed within fully enclosed structures (e.g., having four or more walls, a ceiling, and a floor), the term "enclosure" as used herein can also include any partial structure or barrier. For example, a structure having multiple walls that lacks a ceiling could be used to safely perform welding at a construction site, where it is desirable to prevent slag or other materials from falling into streets or other public or traveled areas, but where maintenance of a positive pressure is unnecessary. Similarly, individual walls or other barriers, usable for various purposes, could be constructed using embodiments of the present disclosure.

Embodied enclosures can include a first panel with a male edge having a front side and a rear side, each comprising a first portion of a fastening medium thereon; and a second panel having a female edge with a first and second flap extending therefrom, each flap having an inner surface with a second portion of the fastening medium thereon. The first flap of the second panel can be engaged with the front side first panel, and the second flap can be engaged with the rear side, via engagement between the first and second portions of the fastening medium.

As described above, in an embodiment, the first and second portions of the fastening medium can include corresponding hook and loop portions of Velcro™ or a similar hook and loop fastening medium, and the fastening medium can extend in a plurality of strips across the length of each edge of the panels to facilitate a secure seal therebetween. The panels can include a heat resistant material, thus enabling embodied enclosures to be usable for welding, hot-work, or similar purposes.

Further embodiments usable within the scope of the present disclosure can include an enclosure having one or more walls formed from one or more panels. Each panel can include at least one male edge having a front and a rear side, and at least one female edge having two or more flaps, the front and rear sides and inner surfaces of the flaps having a fastening medium thereon, as described previously.

For example, a wall of the enclosure can be formed by engaging a male edge of the second panel with a female edge of the first panel, engaging a male edge of the third panel with a female edge of the second panel, engaging a male edge of the fourth panel with a female edge of the third panel, and engaging a male edge of the first panel with a female edge of the fourth panel. In this manner, a wall can be provided with a generally square shape; however, it should be understood that panels having non-square shapes can be used to form walls having other shapes, if desired, or alternatively, more than four panels, or fewer than four panels, can be used to form walls and/or enclosures having other shapes and/or configurations.

In an embodiment, engagement between the first and second panels can define a first axis, while engagement between the third and fourth panels can define a second axis. The first and second axis can be offset from one another in a perpendicular direction, such that the engagement of a first portion of the wall (which includes the first and second panels) is disposed in an overlapping relationship relative to that of a second portion of the wall (which includes the third and forth panels).

Additionally or alternatively, engagement between the second and third panels can define a first axis, while engagement between the first and fourth panels can define a second axis, offset a distance from the first axis in a perpendicular direction, forming an overlapping relationship between portions of the wall. Thus, in an exemplary embodiment, engagement between two horizontally adjacent panels can be horizontally offset from the opposing engagement between two other horizontally adjacent panels, while the opposing vertical engagements between adjacent panels can be similarly offset from one another. This overlapping, offset relationship between engagements can provide improved shear strength and impact resistance.

One or more of the panels within the wall can include additional male and/or female edges, used to engage additional panels for forming an enclosure. Adjacent panels can be angled (e.g, pivoted, folded, and/or bent) relative to one another at the point of engagement, enabling walls to be placed in a perpendicular or other angular relationship relative to one another. Engagement between panels can form seals capable of substantially maintaining a pressure differential on opposing sides thereof and/or forming an enclosed space adapted for performing welding or other hot-work operations.

Embodiments usable within the scope of the present disclosure thereby provide systems and methods of attachment usable to securely maintain positive pressure and/or otherwise provide a seal and/or connection between adjacent members having significant resistance to impact and/or shear forces, that can be quickly and efficiently installed, and that can further incorporate use of interchangeable members. It should be understood that the type of fasteners that can be used in conjunction with this invention are not limited to hook and loop type fasteners, but can also include "Palm Tree" hooks, "J" hoops, and "Mushroom" hooks, all of which are known to one of reasonable skill in the art.

It is commonly known that the shear strength of hook and loop type of fasteners such as Velcro™ (the force applied to parallel pieces pulled in opposite directions) is 10 to 15 pounds per square inch. This means that the more area of Velcro one has, the more shear strength exists. Therefore, by way of example, if the panel was of a square configuration, where each side is approximately 40 inches long (approximately 1 meter), if the width and length of said fasteners are 2 inches by 40 inches respectively, and four strips are employed at each edge of a panel (2 on each of the 2 sides of an edge of a panel) whereas the shear strength of one such strip should be between 10 to 15 pounds per square inch, an unexpected result of this invention was that when one attempts to separate 4 such 80 square inch strips, the shear strength required was substantially more than 15 pounds per square inch since someone attempting to shear one strip of a hook type of fastener from its corresponding loop type of fastener was consistently challenged to make sure that the corresponding hook and loop fastening surfaces on one strip did not come back into contact while one was attempting to shear off the second strip on the same side due the proximity of the hook and loop fastening mechanisms to each other. In almost every non-mechanized attempt to separate one edge panel from the other, once the two edges had been secured as set forth above, resulted in additional force being required to either prevent two unfastened strips from coming back into contact with each other once unfastened, or trying to simultaneously shear apart two such strips. Yet another unexpected result was the benefit of the relatively loud "cautionary" tearing or ripping sound created when two fastening strips start coming apart, either intentionally or unintentionally. In cases where zippers were used to fasten two panels together, if the zipper teeth holding the panels together came apart (either intentionally or unintentionally), such unfastening barely created any noise at all, thereby rendering almost silent any intentional or unintentional separation of the teeth on any given zipper. As such, the characteristic tearing or ripping sound created when two sides of a hook and loop type of fastener came apart added an auditory element to any unfastening process which made the opening action noticeable and positively contributed to the safety aspect of this invention. Finally, yet another unintended result was that the fastening mechanism utilized by this invention provided the dual advantage of not needing impeccable accuracy in fastening two sides together (as with the perfect alignment needed for a smooth closing action when zippers are employed) and yet needing a considerable amount of force to peel the same two sides from each other (as opposed to the minimal amount of force needed for their opening action).

BRIEF DESCRIPTION OF THE DRAWINGS

In the detailed description of various embodiments usable within the scope of the present disclosure, presented below, reference is made to the accompanying drawings, in which:

FIG. 1A depicts a diagrammatic front view of an embodiment of a panel usable within the scope of the present disclosure.

FIG. 1B depicts a diagrammatic rear view of the panel of FIG. 1A.

FIG. 1C depicts a diagrammatic right side view of the panel of FIG. 1A.

FIG. 1D depicts a diagrammatic left side view of the panel of FIG. 1A.

FIG. 2A depicts an exploded diagrammatic front view of an engagement between two panels usable within the scope of the present disclosure.

FIG. 2B depicts a diagrammatic front view of the engagement of FIG. 2A.

FIG. 3 depicts a diagrammatic front view of an engagement between four panels usable within the scope of the present disclosure.

FIG. 4A depicts an isometric side view of an embodiment of an enclosure usable within the scope of the present disclosure.

FIG. 4B depicts an isometric view of an opposing side of the enclosure of FIG. 4A.

FIG. 4C depicts a diagrammatic front view of an escape panel of the enclosure of FIG. 4A.

FIG. 4D depicts a diagrammatic rear view of the escape panel of FIG. 4C.

FIG. 4E depicts a diagrammatic end view of a blower engagement of the enclosure of FIG. 4A.

Figure 2C:
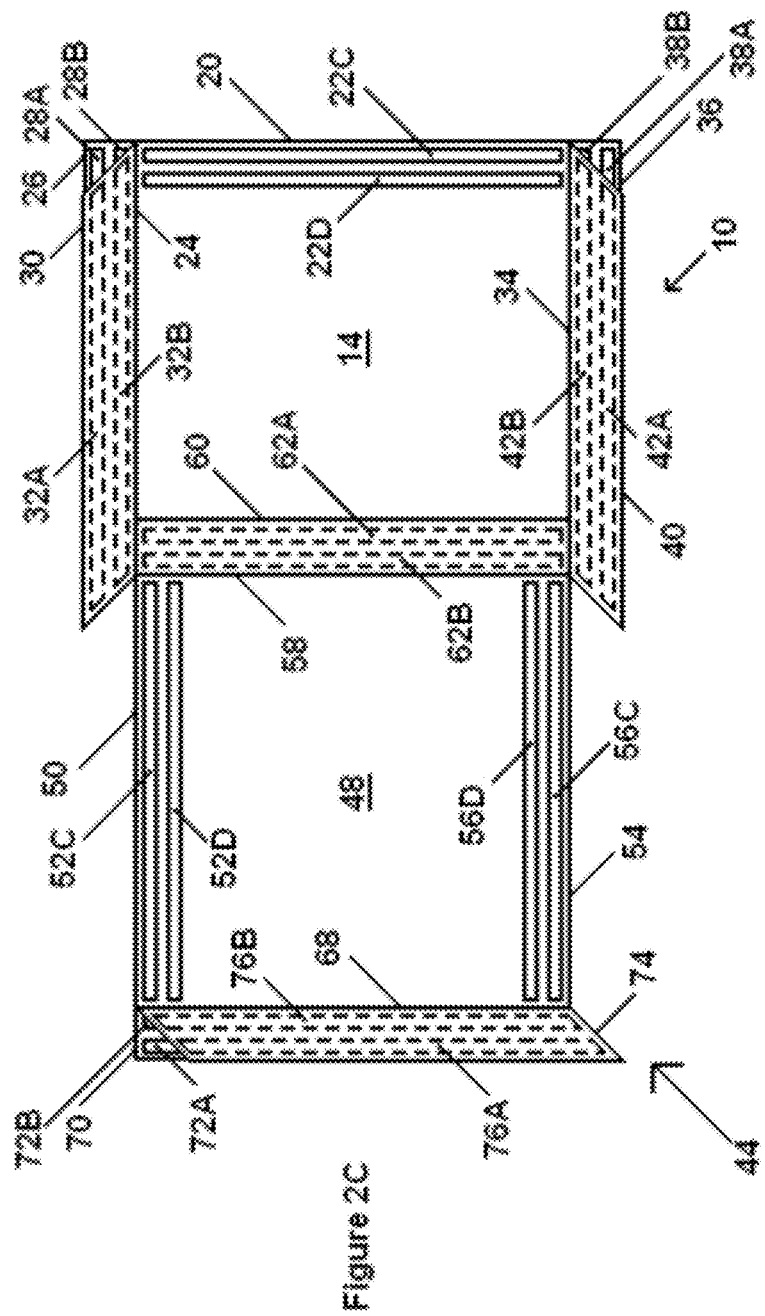
FIG. 2C depicts a diagrammatic rear view of the engagement of FIG. 2B.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Embodiments usable within the scope of the present disclosure relate to systems and methods of attachment usable to form enclosures suitable for welding, hot-work operations, and/or other purposes using one or more panels that can be engaged to form barriers and/or enclosures. FIGS. 1A through 1D depict an embodiment of a panel (10), in which FIG. 1A depicts a diagrammatic front view thereof, FIG. 1B depicts a diagrammatic rear view, FIG. 1C depicts a diagrammatic right side view, and FIG. 1D depicts a diagrammatic left side view.

The panel (10) is shown having a generally thin, square-shaped body, with a front side (12) and a rear side (14). While the panel (10) can be formed from any generally durable material able to maintain its shape, in an embodiment, the panel can be formed from flexible, lightweight, and/or heat resistant materials, such as coated fiberglass, silicone, and/or various other polymers, composites, or other similar materials. Additionally, while the panel (10) is depicted having square shape, it should be understood that panels having other shapes and/or dimensions can be used without departing from the scope of the present disclosure. Further, while the terms "front side" and "rear side" are used to refer to opposing faces of the panel (10), it should be understood that these terms are for reference only, and embodiments of the present disclosure can include panels that are reversible without affecting the function thereof. For example, an embodied panel could include a front side having a first color or characteristic and a rear side having a second color or characteristic, and the panel could be oriented such that a side having a desired characteristic faces the exterior of an enclosure (e.g., for selectively retaining or reflecting heat from the sun).

The depicted panel (10) is shown having a first male edge (16), a second male edge (20) opposite the first male edge (16), a first female edge (24), and a second female edge (34) opposite the first female edge (24).

The first male edge (16) is shown having four portions of a fastening medium (18A, 18B, 18C, 18D) positioned thereon. In a preferred embodiment, the depicted fastening medium (18A, 18B, 18C, 18D) can include strips of Velcro™ or a similar hook and loop fastening medium, though it should be understood that other fastening media and/or means of connection can also be used without departing from the scope of the present disclosure. While these portions of fastening medium (18A, 18B, 18C, 18D) may hereafter be referred to as "hook strips," while corresponding, mating portions of the fastening media may be referred to as "loop strips," it should be readily apparent that the placement of hook and loop portions can be interchanged without affecting the function of the depicted embodiments, and that while strips of fastening media extending across the length of the panel (10) are shown, any number and configuration of mating portions of a fastening medium can be used.

Specifically, the first male edge (16) is depicted having two hook strips (18A, 18B) extending along the length thereof, positioned on the front side (12) of the panel (10), and two hook strips (18C, 18D) extending along the length thereof, positioned on the rear side (14) of the panel (10). The second male edge (20) is shown having a similar configuration of fastening media (22A, 22B, 22C, 22D), hereafter referred to as "hook strips," in which two hook strips (22A, 22B) extend along the length of the second male edge (20) and are positioned on the front side (12) of the panel (10), while two additional hook strips (22C, 22D) extend along the length of the second male edge (20) and are positioned on the rear side (14) of the panel (10).

The first female edge (24) is shown having two flaps (26, 30) extending therefrom, in a direction outward from the body of the panel (10). The flaps (26, 30) can be moved and/or pivoted relative to the body of the panel (10), e.g., as illustrated by the orientation of the flaps (26, 30) shown in FIGS. 1A and 1B, and the differing orientation shown in FIGS. 1C and 1D. The first flap (26) is shown having two portions of a fastening medium (28A, 28B), hereafter referred to as "loop strips," extending across the length of the inner surface thereof. The second flap (30) is similarly shown having two portions of the fastening medium (28C, 28D), hereafter referred to as "loop strips," extending across the length of the inner surface thereof. The second female edge (34) is shown having a similar configuration, in which two flaps (36, 40) extend therefrom. The first flap (36) is shown having two portions of a fastening medium (38A, 38B), hereafter referred to as "loop straps," extending across the length of the inner surface thereof. The second flap (40) is also shown having two portions of the fastening medium (42A, 42B), hereafter referred to as "loop straps," extending across the length of the inner surface thereof.

The depicted panel (10) can be engaged with a generally similar and/or identical panel by placing either male edge (16, 20) of the panel (10) adjacent to a female edge of an additional panel, then closing the flaps of the female edge over the male edge (16, 20), such that a first flap contacts the front side (12), causing loop straps on the flap to engage hook straps (18A, 18B, 22A, 22B) on the front side (12), and a second flap contacts the rear side (14), causing loop straps on the flap to engage hook straps (18C, 18D, 22C, 22D) on the rear side (14).

The depicted panel (10) can also be engaged with a generally similar and/or identical panel by placing either female edge (24, 34) adjacent to a male edge of an additional panel, then closing the flaps (26, 30, 36, 40) over the male edge, such that a first flap contacts a front side of the male edge and a second flap contacts a rear side of the male edge, causing engagement between the loop straps (28A, 28B, 38A, 38B) of one of the flaps (26, 36) and one side of the male edge, and engagement between the loop straps (32A, 32B, 42A, 42B) of the opposing flap (30, 40) and the opposing side of the male edge.

FIGS. 2A through 2C depict an engagement between two panels (10, 44) usable within the scope of the present disclosure. Specifically, FIG. 2A depicts an exploded diagrammatic front view of engagement between the panels (10, 44), with dashed lines extending therebetween to indicate a connection. FIG. 2B depicts a diagrammatic front view of the engagement, while FIG. 2C depicts a diagrammatic rear view thereof.

The first panel (10) is substantially identical to that shown in FIGS. 1A through 1D, and as such, identical and/or similar corresponding parts have been provided with the same reference numerals. The second panel (44), shown adjacent to and engaged with the first panel (10), is depicted as identical or substantially similar to the first panel (10), rotated ninety degrees such that a female edge of the second panel (44) is positioned to engage the first male edge (16) of the first panel (10). Use of identical panels enables interchangeable assembly and/or replacement of the panels, facilitating rapid installation and/or repair of enclosures.

Specifically, the second panel (44) is shown having a front side (46) and a rear side (48), a first male edge (50), a second male edge (54), a first female edge (58), and a second female edge (68).

The first male edge (50) includes two portions of a fastening medium (52A, 52B), hereafter referred to as "hook strips," extending across the length of the front side (46), and two portions of the fastening medium (52C, 52D), hereafter referred to as "hook strips," extending across the length of the rear side (48). The second male edge (54) also includes two portions of the fastening medium (56A, 56B), hereafter referred to as "hook strips," extending across the length of the front side (46), and two portions of the fastening medium (56C, 56D), hereafter referred to as "hook strips," extending across the length of the rear side (48).

The first female edge (58) is shown having two flaps (60, 64) extending therefrom, the first flap (60) having two portions of the fastening medium (62A, 62B), hereafter referred to as "loop strips," extending across the length thereof, and the second flap (64) having two portions of the fastening medium (66A, 66B), hereafter referred to as "loop strips," extending across the length thereof. Similarly, the second female edge (68) is shown having two flaps (70, 74)

extending therefrom, the first flap (70) having two portions of the fastening medium (72A, 72B), hereafter referred to as "loop strips," extending across the length thereof, and the second flap (74) having two portions of the fastening medium (76A, 76B), hereafter referred to as "loop strips," extending across the length thereof.

To engage the first panel (10) with the second panel (44), the first male edge (16) of the first panel (10) can be placed proximate and/or adjacent to the first female edge (58) of the second panel (44), such that the first male edge (16) is positioned between the flaps (60, 64) extending from the first female edge (58). The flaps (60, 64) extending from the first female edge (58) can then be moved (e.g., closed and/or pivoted) to contact the first male edge (16), thereby engaging hook strap (18A) with loop strap (66B), hook strap (18B) with loop strap 66A, hook strap (18C, shown in FIG. 1B) with loop strap 66B, and hook strap (18D, shown in FIG. 1B) with loop strap (66A).

The depicted engagement between the panels (10, 44) mates four hook strips (18A, 18B, 18C, 18D) of a hook and loop fastening medium with four loop strips (62A, 62B, 66A, 66B) of the hook and loop fastening medium, each of the strips extending across substantially the entire length of the panels (10, 44). The depicted engagement can form a seal capable of maintaining a pressure differential on opposing sides of the panels (10, 44) (e.g., for forming a positive pressure environment within an enclosure). Additionally, the depicted engagement exhibits significantly improved impact resistance and shear strength over seals within conventional flexible enclosures (e.g., formed using zippers or other conventional fasteners).

While FIGS. 2A through 2C depict a single engagement between two panels (10, 44), it should be noted that other additional panels having male and/or female edges, as described above, can be engaged with the depicted panels (10, 44) in a similar manner, to form a barrier and/or enclosure of any desired size or shape. Additionally, while FIGS. 2A through 2C show a female edge (58) of the second panel (44) engaging a male edge (16) of the first panel (10), it should be understood that any orientation and engagement between any male edge and any female edge of two adjacent panels can be used. The panels (10, 44) can be moved and/or pivoted relative to one another at the point of engagement along the first female edge (58). Thus, for example, five or more panels having the depicted configuration, and/or five or more generally flat barriers (e.g., walls) formed from multiple panels, could be engaged in the manner described above and placed in a perpendicular relationship relative to one another to define an enclosure having the shape of a cube or rectangular prism. During operations where a full enclosure is not necessary, panels and/or groups of panels could be engaged to form an enclosed space, lacking a cover or roof and/or a bottom or floor.

Referring now to FIG. 3, a diagrammatic front view of an engagement between four panels (10, 44, 78, 80) is shown, e.g., forming a generally continuous wall usable as part of an enclosure. Each of the depicted panels (10, 44, 78, 80) includes a configuration similar or identical to that of the panels depicted in FIGS. 1A through 2C, thus for clarity, only the operative edges of each panel (10, 44, 78, 80) and engagements therebetween are labeled with reference numerals.

Specifically, the first panel (10) is shown is shown engaged with the second panel (44) at engagement (82), which can be formed through connection between hook and loop fastening media disposed on a male edge of the first panel (10) and a female edge of the second panel (44) in the manner described previously. Similarly, the second panel (44) is shown engaged with the third panel (78) at engagement (84), which can be formed through connection between hook and loop fastening media disposed on a male edge of the second panel (44) and a female edge of the third panel (78). The third panel (78) is shown engaged with the fourth panel (80) at engagement (86), which can be formed through connection between hook and loop fastening media disposed on a male edge of the third panel (78) and a female edge of the fourth panel (80). The fourth panel (80) is shown engaged with the first panel (10) at engagement (88), which can be formed through connection between hook and loop fastening media disposed on a male edge of the fourth panel (80) and a female edge of the first panel (10).

Engagement between the first and fourth panels (10, 80) and between the third and second panels (78, 44) thereby defines a first axis (91), while engagement between the first and second panels (10, 44) and between the third and fourth panels (78, 80) defines a second axis (93). Due to the arrangement of male and female edges on the panels (10, 44, 78, 80), each of the engagements (82, 84, 86, 88) are offset from the adjacent axes (91, 93), providing the depicted array of panels with an overlapping engagement. For example, the first and third engagements (82, 86) are offset from one another by a distance (92), while the second and fourth engagements (84, 88) are offset from one another by a distance (90). This overlapping arrangement provides the depicted engagements between panels with added strength. For example, impacts, wind, and/or other forces applied to the panels (10, 44, 78, 80) are significantly less likely to separate offset engagements than two engagements in linear alignment with one another.

As described previously, the depicted arrangement of panels (10, 44, 78, 80) can be engaged with additional panels to form walls or barriers of any size, or to form sealed enclosures suitable for performing welding and/or similar operations. For example, the panels (10, 44, 78, 80) are shown including additional male edges (94) usable for engagement with female edges of additional panels in the manner described previously, and additional female edges (96) usable for engagement with male edges of additional panels in the manner described previously.

FIGS. 4A through 4E depict an embodiment of an enclosure (98), e.g., a structure formed from a plurality of walls such as that shown in FIG. 3, and parts thereof, usable to perform various undertakings within, such as hot-work operations. Specifically, FIG. 4A depicts an isometric side view of the enclosure (98), FIG. 4B depicts an opposing isometric side view thereof, FIGS. 4C and 4D depict front and rear views of an escape panel (110) of the enclosure (98), respectively, and FIG. 4E depicts a diagrammatic end view of a blower engagement (120) of the enclosure (98).

The enclosure (98) is shown having a generally cubical shape, in which a ceiling (100), four walls (102, 104, 106, 108), and optionally, a base (not shown), each having a configuration identical or similar to that of the wall shown in FIG. 3, can be engaged in the manner described previously. As described above, engagement between overlapping male and female edges using strips of hook and loop fastening media can provide a generally airtight seal to form an enclosure capable of maintaining a positive pressure within.

A first wall (102) is shown having a door (116) installed therein, the panel of the first wall (102) that includes the door having a height selected to accommodate the door (116). The depicted panel therefore includes both a male and a female engagement on a single edge thereof, for engaging two adjacent panels.

A second wall (104) is shown having an escape panel (110) installed therein, the escape panel (110) including a slit (112) through which an individual can quickly exit the enclosure (98) should internal or external conditions become hazardous. Conventional exit panels include a slit or similar opening that is secured in a closed position using a zipper. Due to the hazards inherent when a zipper faces the inside of an enclosure used for performing hot work and similar dangerous undertakings, these zippered openings are normally covered by a flap of material, which can be secured using Velcro™ or a similar medium. When escape from the enclosure is necessary, both the cover flap and the zipper must be manipulated quickly, and rapid manipulation of a zipper can cause the zipper to become damaged or caught.

The depicted escape panel (110), however, as shown in FIGS. 4C and 4D, does not include a zipper or similar fastener and simply maintains an open slit (112), which is coverable by a flap (150). The slit (112) is shown having two strips of a hook and loop fastening medium (122, 124) on either side thereof, extending along the length of the slit (112). The flap (150) is similarly shown having two strips of a hook and hoop fastening medium (150, 152) attached on an interior side thereof, such that when the flap (150) is folded, pivoted, and/or otherwise moved to cover the slit (112), fastening medium (122) is engaged by fastening medium (150), while fastening medium (124) is engaged by fastening medium (152). The depicted arrangement, using four strips of fastening medium (122, 124, 152, 154) extending along the length of the slit (112), provides a secure engagement able to maintain a positive pressure within the enclosure (98), that is extremely unlikely to become damaged or disengaged due to impact or other internal or external forces common to a hot work environment. Additionally, the depicted arrangement provides a slit (112) that is more easily uncovered and accessed than a conventional zippered panel.

The depicted escape panel (110) is also shown having a male engagement (126) and a female engagement (132) on an edge thereof, usable to engage two adjacent panels in the manner described previously. Other edges of the escape panel (110) can similarly include male and female engagements (not shown) for engaging the escape panel (110) with other portions of the enclosure (98), as depicted in FIG. 4A.

The third wall (106) of the enclosure (98) is shown having a blower engagement (120), usable, in various embodiments, to engage a conduit of a blower, vent, pump, or similar apparatus configured for flowing one or more gasses into or from the enclosure (98). The blower engagement (120) is shown having male and female portions, the male portion including four strips of hook and loop fastening medium (168, 170, 172, 174) on opposing sides thereof, and the female portion including two flaps (156, 162), each flap (156, 162) having two strips of hook and loop fastening medium (158, 160, 162, 164) thereon. When closed (e.g., engaged about a conduit of a blower), fastening medium (158) engages fastening medium (170), fastening medium (160) engages fastening medium (168), fastening medium (164) engages fastening medium (174), and fastening medium (166) engages fastening medium (172). Use of the depicted arrangement provides for an adjustable, generally gas-tight conduit of the enclosure (98) usable to engage a blower, vent, or similar apparatus.

Embodiments described herein thereby provide systems and methods of attachment usable to form enclosures capable of securely maintaining positive pressure quickly and efficiently, without requiring mating and alignment of zippers or similar two-part fastening systems, the embodied enclosures being significantly more secure and far less likely to become unfastened and/or damaged than conventional alternatives. Embodiments described herein can also include interchangeable panels, and in various embodiments, panels having special features, such as doors, escape panels, and/or blower engagements can be used.

While various embodiments usable within the scope of the present disclosure have been described with emphasis, it should be understood that within the scope of the appended claims, the present invention can be practiced other than as specifically described herein.

What is claimed is:

1. An enclosure comprising:
   a first panel having a male edge with a front side and a rear side, wherein the front side and the rear side each comprise a first portion of a fastening medium thereon; and
   a second panel having a female edge with a first flap and a second flap extending therefrom,
   wherein the first flap and the second flap each have an inner surface comprising a second portion of the fastening medium thereon adapted for engagement with the first portion of the fastening medium, wherein the first flap engages the front side and the second flap engages the rear side via engagement between the first portion and the second portion of the fastening medium,
   wherein the engagement between the first panel and the second panel forms a seal adapted to maintain a pressure differential across opposing sides thereof.

2. The enclosure of claim 1, wherein engagement between the first flap and the front side, engagement between the second flap and the rear side, or combinations thereof, forms a seal adapted to maintain a pressure differential across opposing sides thereof.

3. The enclosure of claim 1, wherein the first portion of the fastening medium, the second portion of the fastening medium, or combinations thereof, comprise a plurality of strips of a hook and loop fastening medium.

4. The enclosure of claim 1, wherein the first panel, the second panel, or combinations thereof, is formed at least partially from a heat resistant material.

5. An enclosure comprising:
   a wall comprising a first panel, a second panel, a third panel, and a fourth panel,
   wherein the first panel comprises a first male edge having a front side and a rear side and a first female edge having at least two flaps extending therefrom, wherein the front side and the rear side each comprise a first portion of a fastening medium thereon, and wherein said at least two flaps each have an inner surface comprising a second portion of the fastening medium thereon,
   wherein the second panel comprises a second male edge having a front side and a rear side and a second female edge having at least two flaps extending therefrom, wherein the front side and the rear side each comprise a first portion of the fastening medium thereon, and wherein said at least two flaps each have an inner surface comprising a second portion of the fastening medium thereon,
   wherein the third panel comprises a third male edge having a front side and a rear side and a third female edge having at least two flaps extending therefrom, wherein the front side and the rear side each comprise a first portion of the fastening medium thereon, and wherein said at least two flaps each have an inner surface comprising a second portion of the fastening medium thereon, wherein the fourth panel comprises a fourth male edge having a front side and a rear side and a fourth female edge having at least two flaps extending therefrom, wherein the front side and the rear side each comprise a first portion of the fastening medium thereon, and wherein said at least two flaps each have an inner surface comprising a second portion of the fastening medium thereon, wherein the second panel is engaged with the first panel via engagement between the first female edge and the second male edge, wherein the third panel is engaged with the second panel via engagement between the second female edge and the third male edge, wherein the fourth panel is engaged with the third panel via engagement between the third female edge and the fourth male edge, and wherein the first panel is engaged with the fourth panel via engagement between the fourth female edge and the first male edge; and wherein the engagement between the first panel and the second panel, engagement between the second panel and the third panel, engagement between the third panel and the fourth panel, engagement between the fourth panel and the first panel, or combinations thereof, forms a seal adapted to maintain a pressure differential across opposing sides thereof.

6. The enclosure of claim 5, wherein engagement between the first panel and the second panel defines a first axis, and wherein engagement between the third panel and the fourth panel defines a second axis, and wherein the first axis is offset a distance from the second axis in a direction generally perpendicular to the first axis and the second axis to form an overlapping engagement between a first portion of the wall and a second portion of the wall.

7. The enclosure of claim 5, wherein engagement between the second panel and the third panel defines a first axis, and wherein engagement between the fourth panel and the first panel defines a second axis, and wherein the first axis is offset a distance from the second axis in a direction generally perpendicular to the first axis and the second axis to form an overlapping engagement between a first portion of the wall and a second portion of the wall.

8. The enclosure of claim 5, wherein the first panel, the second panel, the third panel, the fourth panel, or combinations thereof, further comprise at least one additional edge having a front side and a rear side, wherein the front side and the rear side each comprise a first portion of the fastening medium thereon for engagement with at least one additional panel.

9. The enclosure of claim 5, further comprising at least one additional edge having a first flap and a second flap extending therefrom, wherein the first flap and the second flap each have an inner edge comprising a second portion of the fastening medium for engagement with at least one additional panel.

10. The enclosure of claim 5, wherein each first portion of the fastening medium, each second portion of the fastening medium, or combinations thereof, comprise a plurality of strips of a hook and loop fastening medium.

11. The enclosure of claim 5, further comprising at least one additional wall engaged with the wall to form an enclosed space adapted for performing hot work, for containing a pressure differential therein, or combinations thereof.

12. The enclosure of claim 5, wherein engagement between the first panel and the second panel, engagement between the second panel and the third panel, engagement between the third panel and the fourth panel, engagement between the fourth panel and the first panel, or combinations thereof, comprise engagement between a first of said flaps and one of the front sides and a second of said flaps and one of the rear sides via engagement between the first portion and the second portion of the fastening medium.

\* \* \* \* \*